UNITED STATES PATENT OFFICE.

WILLIAM H. HAIGHT, OF LEAVENWORTH, KANSAS.

IMPROVEMENT IN COMPOSITIONS FOR DRAIN-TILES, PAVING-BLOCKS, &c.

Specification forming part of Letters Patent No. 212,377, dated February 18, 1879; application filed November 15, 1878.

*To all whom it may concern:*

Be it known that I, WILLIAM H. HAIGHT, of the city of Leavenworth, in the county of Leavenworth and State of Kansas, have invented a new and useful Compound for Drain-Tiles, Paving-Blocks, &c., which is fully described in the following specification.

This invention relates to that class of compounds used in the manufacture of farm-drain tile, sewer-pipe, arched blocks for the construction of large sewers, and blocks for paving streets and sidewalks.

To prepare the compound, take fifty (50) gallons of coal-tar, and twenty (20) pounds of Portland cement; boil at 212° until a small quantity of the mixture will stand 135° of heat without softening; then run this through a tank containing ten (10) pounds of brimstone. The sulphur is mixed with the coal-tar and Portland cement by running the coal-tar and Portland cement from the evaporating-tank (where they have been boiled together) in a melted state into a closed tank containing the ten pounds of sulphur.

To prepare the compound for use put thirty (30) pounds of the above mixture into a tank, and, when melted, add one and a half bushel of sand, half bushel of fine gravel, one and one-half pound of plaster-of-paris, three and three-quarters pounds of oxide of iron, and mix all the ingredients thoroughly together while in a melted state. This is the right proportion in which to prepare one and a half cubic feet for actual use; and it will now stand 170° of heat without softening. This material possesses great strength, durability, qualities of resisting the effects of heat and cold, will not absorb dampness, and is easily molded to any shape while hot.

I claim as my invention—

A compound composed of coal-tar, Portland cement, brimstone, oxide of iron, plaster-of-paris, sand, and gravel, substantially as set forth, and for the purpose specified.

WILLIAM H. HAIGHT.

Attest:
  S. SIMPSON,
  WM. W. HAIGHT.